United States Patent Office 3,573,972
Patented Apr. 6, 1971

3,573,972
GLAZE COMPOSITIONS AND METHOD
William H. McNeely and William P. Fairchild, San Diego, and Austin R. Hunter, La Mesa, Calif., assignors to Kelco Company, San Diego, Calif.
No Drawing. Continuation of application Ser. No. 547,748, May 5, 1966, which is a continuation-in-part of application Ser. No. 416,147, Dec. 4, 1964, which in turn is a continuation-in-part of application Ser. No. 11,988, Mar. 1, 1960. This application Jan. 8, 1970, Ser. No. 3,555
Int. Cl. C03c 17/00
U.S. Cl. 117—169   10 Claims

ABSTRACT OF THE DISCLOSURE

A method of glazing in which an aqueous glaze mixture containing a small effective quantity of a Xanthomonas hydrophilic colloid is applied as a coating to a substrate material which is then fired to form a glazed surface. The quantity of Xanthomonas hydrophilic colloid present in the glaze mixture is effective to increase the cling of the mixture to the substrate material while, at the same time, providing good spreadability of the glaze mixture. After application of the coating of aqueous glaze material to the substrate material, the coated substrate is fired.

---

This application is a continuation of application Ser. No. 547,748, filed May 5, 1966, now abandoned, which was a continuation-in-part of application Ser. No. 416,147, filed Dec. 4, 1964, now abandoned, which in turn was a continuation-in-part of application Ser. No. 11,988, filed Mar. 1, 1960, now abandoned.

This invention relates to a method for glazing involving the use of a glaze composition containing a small but effective quantity of a Xanthomonas hydrophilic colloid material.

The use of vitreous glazes or enamel coatings for objects such as kitchenware, sanitaryware, home appliances and the like is widespread. This generally involves preparing a mixture of vitreous materials, such as an aqueous dispersion of silicates, applying it to a substrate such as a refrigerator panel, drying, and thereafter firing the panel to vitrify the glaze materials. Such glazes are commonly applied to metals such as sheet steel, and cast iron and also to ceramic substrates.

In glazing, the fritted materials are dispersed in water and the consistency is adjusted by the amount of water which is added. The desired consistency will depend to some extent on the mode of application such as brushing, dipping, or spraying the glaze upon the decorated surface. The virteous frit material may be any raw vitreous powdered ingredients which have been mixed together, heated to the point of sintering or melting, cooled, and thereafter ground up into particles (frits) of generally uniform fineness. These frits are dispersed in an aqueous medium to form the glaze mixture.

In addition to frits and water, glaze mixtures may contain other ingredients such as clays, flocculation-control agents, pigments, opacifiers, adhesives, and the like. The frits will constitute a major portion of the glaze mixture as, for example, about 60% by weight. Generally the frits are finely ground, for instance, below 100 mesh. Oftimes, the glaze mixture contains a major portion of clay material, such as about 3 to 10% of a high-viscosity North Carolina kaolin to act as a combination adhesive, opacifier and flocculent. A minor portion of an electrolyte material may be present for flocculation-control. Also, a transition metal, such as a cobalt or nickel compound, may be added to improve adherence to a metal substrate.

Aqueous fritted glazes are oftimes difficult to use because they do not adhere uniformly to the surface to which they are applied. For example, when applied to a vertical surface, the glaze mixture may sag and run to give a nonuniform coating. If the solids content of the glaze mixture is increased in order to increase its consistency and improve its cling, the viscosity of the glaze mixture may be raised to the point where it is difficult to apply by a mass production technique such as spraying.

Efforts to resolve the problem of increasing glaze mobility and spreadability, without decreasing its cling properties, have been unsatisfactory. To illustrate, increasing the water content of the glaze will increase its spreadability, but this will also decrease its cling properties and, in addition, increase drying time. Moreover, the cling-spreadability problem is complicated by the fact that the viscosity of the glaze must be kept sufficiently high to suspend the frits in order to obtain a reasonably homogeneous glaze mixture.

The problem of cling vs. spreadability is greater in thin-glaze applications. Here, the glaze must closely follow the contours of a surface which may be curved or rippled and provide complete coverage with good hiding power even though applied in a relatively thin coat. If, for example, the application is by brush, the glaze must exhibit a high ability to cling to the surface and yet not be so sticky as to resist ready, uniform flow-out to a thin coating under the leveling action of the brush.

An object of this invention is to provide an improved method for glazing in which the glaze mixture adheres well to the surface to which it is applied and yet has suitable spreadability.

A further object is to provide a method for glazing in which the glaze material is sufficiently viscous to suspend the frits contained therein, has good cling to the substrate material, and yet has good spreadability and flow properties when subjected to shear forces.

Additional objects will become apparent from the description and claims which follow.

In accord with our invention, we have found that the foregoing objectives may be achieved by employing a glazing method in which a small effective quantity of a Xanthomonas hydrophilic colloid is added to a frit-containing aqueous glazing mixture. A suitable quantity of a Xanthomonas hydrophilic colloid is from about 0.1% to about 2.0% by weight of the water in the glazing mixture. A preferred range is from about 0.25 to about 1.0% by weight of the water in the glazing mixture.

A preferred Xanthomonas hydrophilic colloid for use in our method is that produced by the bacterial species *Xanthomonas campestris*. This material is a polymer containing mannose, glucose, potassium glucuronate and acetyl radicals. In the polymer, the potassium portion can be replaced by several other cations without substantial change in the property of the material for the instant purpose. The polymer, which is a high molecular weight, exocellular material, may be prepared from the bacterium *Xanthomonas campestris* by whole culture fermentation of a medium containing 2% to 5% commercial glucose, an organic nitrogen source, dipotassium hydrogen phosphate and appropriate trace elements. The incubation time is approximately 96 hours at 28° C., aerobic conditions. In preparing the material as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage, a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth of larger volume in a second intermediate stage. In this stage, the reaction may be permitted to continue for 24 hours under the same conditions as the first stage. The culture so acclimated for use with glucose by the aforementioned first and second stages is then added to the final glucose medium. In the aforesaid method of preparing a *Xanthomonas campestris* hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage, the material produced in the second stage may be admixed with 19 times its volume in the final medium. A good final medium may contain 3% glucose, 0.5% distillers' dry solubles, 0.5% dipotassium phosphate, 0.1% magnesium sulfate having seven moles of water of crystallization and water. The reaction in the final stage may be satisfactorily carried out for 96 hours at 30° C. with vigorous agitation and aeration. The resulting *Xanthomonas campestris* colloidal material which we have found to be particularly suitable for our purpose can be recovered by precipitation in methanol. Also, it can be obtained by drying the fermentation beer, as, for example, by passing it through a drum dryer or other similar drying means. This resulting material may be characterized as a hydrophilic colloid produced by the bacterial species *Xanthomonas campestris,* or simply, a *Xanthomonas campestris* hydrophilic colloid.

Other Xanthomonas hydrophilic colloids are prepared by repeating the above preparation procedure using other known Xanthomonas bacteria, e.g., *Xanthomonas incanae, Xanthomonas carotae, Xanthomonas begoniae, Xanthomonas phaseoli,* and *Xanthomonas malvacearum,* in place of *Xanthomonas campestris.*

These alternative Xanthomonas hydrophilic colloids are not full equivalents, i.e., they may be used in slightly different proportions than the *Xanthomonas campestris* hydrophilic colloid. In Table I are listed various Xanthomonas hydrophilic colloids giving the weight ratios in which they are used to obtain approximately equivalent results in our process.

Table I

| Xanthomonas colloid: | Colloid quantity in parts by weight |
|---|---|
| *Xanthomonas campestris* colloid | 1 |
| *Xanthomonas malvacearum* colloid | 1.25 |
| *Xanthomonas carotae* colloid | 1.25 |
| *Xanthomonas begoniae,* strain 3, colloid | 1.65 |
| *Xanthomonas begoniae,* strain 9, colloid | 1.1 |
| *Xanthomonas incanae* colloid | 1.5 |
| *Xanthomonas phaseoli* colloid | 1.1 |

To further illustrate our invention there are presented the following examples in which all parts and percentages are by weight unless otherwise indicated.

EXAMPLE I

A thoroughly cleaned metal sheet of the "Armco" type is used as the substrate material. A ground coat is applied to the sheet by spraying to a weight of about 2 ounces per square foot of sheet after drying. A ground coat frit batch contains the following ingredients:

| | Percent |
|---|---|
| Feldspar | 30 |
| Flint | 20 |
| Borax | 30 |
| Soda ash | 8 |
| Fluorspar | 6 |
| Sodium nitrate | 4 |
| Cobalt oxide | 0.5 |
| Nickel oxide | 0.3 |
| Manganese dioxide | 1.2 |

The batch is prepared by first melting in a frit furnace, and then quenching in water. The frit is then incorporated into a glaze mixture by ball milling the following ingredients:

| | Parts |
|---|---|
| *Xanthomonas campestris* hydrophilic colloid | 0.5 |
| Frit | 100.0 |
| Clay | 3.0 |
| Water | 50.0 |

The milling is carried on until 26% of the ingredients pass through a 200-mesh screen. After application the layer is dried rapidly and then fired in a muffle furnace for about 2½ minutes at 830° to 885° C. After the ground coat has been fired and has cooled, a cover coat is then applied. The frit employed in the cover coat contains:

| | Percent |
|---|---|
| Feldspar | 25.0 |
| Borax | 25.5 |
| Flint | 21.0 |
| Soda ash | 3.0 |
| Sodium nitrate | 3.5 |
| Cryolite | 14.0 |
| Zinc oxide | 5.0 |
| Antimony trioxide | 3.0 |

The above ingredients are fritted in the same manner as the frit used in the ground coat and compounded with the following ingredients to form a glaze mixture:

| | Parts |
|---|---|
| *Xanthomonas campestris* hydrophilic colloid | 1.0 |
| Frit | 100.0 |
| Tin oxide | 8.0 |
| Water | 50.0 |

This is ground with 94 to 97% pass through a 200-mesh screen. It is sprayed on the ground coat at a weight of about 6 ounces per square foot after drying. After drying, the glaze coat is fired for about 3 minutes at 800° to 850° C. For high grade work two cover coats may be used, the second one being fired about 10° C. lower than the first.

When Example I is repeated using varying contents of *Xanthomonas campestris* hydrophilic colloid ranging from 0.25 to 1.0% of the water in the base coat or cover coat glaze mixture, satisfactory glazes are obtained. Similarly, satisfactory glazes are obtained when Xanthomonas hydrophilic colloids, as described previously, are used in the glaze mixture in lieu of *Xanthomonas campestris* hydrophilic colloid.

EXAMPLE II

To a steel sheet is applied a cover coat of a glaze mixture containing:

| | Parts |
|---|---|
| Frits | 100 |
| Clay | 3 |
| Opacifier | 0–8 |
| *Xanthomonas campestris* hydrophilic colloid | 0.25–0.50 |
| Water | 38–40 |

The composition of the frits in the cover coating is conventional and comprises the following:

| | Percent |
|---|---|
| Feldspar | 30 |
| Flint | 20 |
| Borax | 30 |
| Soda ash | 8 |
| Fluorspar | 6 |
| Sodium nitrate | 4 |
| Cobalt oxide | 0.5 |
| Nickel oxide | 0.3 |
| Manganese oxide | 1.2 |

After applying the cover coat to the steel sheet by spraying, the sheet is dried and fired in the manner employed in Example I to give a satisfactory glaze.

When the cover coat of glaze mixture is applied by means other than spraying, such as brushing, a satisfactory glaze is obtained.

In coating a ceramic surface according to our invention, the glaze mixture may be modified in a known manner to improve the adherence of the glaze to the substrate material. For example, the glaze mixture of Example II could be employed with a ceramic material by deleting the transition metal oxides and adding suitable glass forming oxides such as $SiO_2$ and $B_2O_3$.

Various known opacifiers may be used in the glaze mixture for their hiding or coloring properties. Opacifiers are generally used in glazing a metallic surface which may be darkened by the action of the transition elements upon its surface. Typical opacifiers are antimony oxide, titanium dioxide, etc.

Any of the various known frit compositions employed in glazing may be used in the glazing method of our invention. The choice of a particular frit will depend on several factors including the nature of the substrate material, the firing temperature employed, etc.

Frits may be derived from many combinations and mixtures of minerals including potash, feldspar, borax, quartz, soda ash, sodium nitrate, fluorspar, cobalt oxide, nickel oxide, manganese oxide, cryolite, sodium fluorosilicate, sodium antimonate, bone ash, red lead, tin oxide, zinc oxide, barium carbonate, arsenic oxide, potassium nitrate, and the like.

The term "frit," as used throughout the specification, is intended to include particles of ground glass-like material used in making glazes and enamels and which are generally formed by first melting the mineral ingredients and then rapidly cooling or quenching the melt. The premelted or sintered glass particles are then ground to a relatively fine consistency to facilitate their application to a substrate in the form of an aqueous glaze mixture.

Glaze opacifiers and pigments as referred to previously, are common ingredients in glaze mixtures. These are often used to hide discolorations and stains on a surface. For instance, opacifiers are employed to hide the dark staining that occurs on a metallic surface due to the reaction of the surface with transition metals contained in the glaze composition. Common opacifiers are the oxides of titanium, zirconium, antimony, zinc, tin, and the like. Titanium dioxide is often used as is tin oxide.

If a colored enamel is desired, then pigments may be added, such as the oxides of nickel, zinc, or manganese, cobalt compounds, uranium oxide, cupric oxides, and oxides of chromium, tin or ferric oxide. Additionally, certain clays may be employed as opacifiers or pigments.

As shown by the foregoing specification, our invention provides a novel method of glazing in which the aqueous glaze mixture has improved cling and less tendency to run or sag. At the same time the glaze mixture has good spreadability such that it can be worked by brushing, rolling, and the like to give a generally uniform coating. Our method has general application to any aqueous glaze mixture including the various additives employed by the prior art.

In addition to the foregoing, the use of a Xanthomonas hydrophilic colloid in glazing has various other advantages. To illustrate, when a glaze composition is sprayed onto a ceramic substrate, the substrate may contain some moisture or may be bone dry. The ceramic substrate may have a tendency to soak up the water content of the glaze somewhat like spraying a sponge. If the water is adsorbed too rapidly, some air may be entrapped in the pores of the substrate material. On subsequent firing of the coated substrate, the entrapped air can cause pinholes or blisters in the finished product if the firing is conducted too rapidly.

The presence of a Xanthomonas hydrophilic colloid in the glaze composition, as previously described, tends to hold the glaze on the surface of the substrate material where it is applied, as by spraying, so that the glaze is not adsorbed to an undue extent by the substrate material, thereby entrapping air within its pores.

In the preparation of glaze compositions, they are generally aged to fully hydrate clays contained therein. The use of a Xanthomonas hydrophilic colloid in the glaze, as described previously, holds the insoluble particles in suspension and minimizes settling. If the glaze is to be held for some time, a preservative for the Xanthomonas hydrophilic colloid, such as formaldehyde, is generally employed in the glaze composition.

A Xanthomonas hydrophilic colloid, as previously defined, is compatible with the various minerals used in glazes. It will not defloculate clay, and it is compatible with wide changes in pH and temperature with only a very slight change in viscosity.

The use of a Xanthomonas hydrophilic colloid has been found to promote faster grinding of the mineral ingredients of the glaze. These ingredients are reduced to the proper particle size by grinding, usually in a ball mill. The presence of a Xanthomonas hydrophilic colloid has the ability to keep the particles separate and to prevent their reagglomeration.

In adding the Xanthomonas hydrophilic colloid to the glaze, it can be added to the finished glaze as a dry powder and mixed in with an appropriate mixer, e.g., a Cowles mixer. Also, it can be added to the glaze in the form of a presolution in water to facilitate mixing. If little or no mixing equipment is available, a water-miscible organic dispersion of the Xanthomonas hydrophilic colloid can be added to the makeup water.

The presence of a Xanthomonas hydrophilic colloid in the glaze composition improves the ability of the glaze to cover small imperfections in the substrate material, such as a ceramic body. The Xanthomonas hydrophilic colloid has some tendency to swell during the initial firing and this further aids in covering small imperfections in the substrate material with the glaze.

Having fully defined our invention, we desire to be limited only by the lawful scope of the appended claims.

What is claimed is:

1. A process for glazing comprising applying a coating of an aqueous mixture to a substate material, including in said aqueous glaze mixture a small quantity of a Xanthomonas hydrophilic colloid in an amount effective to increase the cling of said aqueous glaze mixture to said substrate material while providing good spreadability of said glaze mixture, and firing said coated substrate material to form a glazed surface thereon.

2. The process of claim 1 wherein said Xanthomonas hydrophilic colloid is present in a concentration ranging from about 0.1 to about 2% by weight of the water in said glaze mixture.

3. The process of claim 1 wherein said Xanthomonas hydrophilic colloid is produced by the bacterium *Xanthomonas campestris*.

4. The process of claim 1 wherein said Xanthomonas hydrophilic colloid is produced by the bacterium *Xanthomonas malvacearum*.

5. The process of claim 1 wherein said Xanthomonas hydrophilic colloid is produced by the bacterium *Xanthomonas carotae*.

6. The process of claim 1 wherein said Xanthomonas hydrophilic colloid is produced by the bacterium *Xanthomonas begoniae*.

7. The process of claim 1 wherein said Xanthomonas hydrophilic colloid is produced by the bacterium *Xanthomonas incanae*.

8. The process of claim 1 wherein said Xanthomonas hydrophilic colloid is produced by the bacterium *Xanthomonas phaseoli*.

9. The process of claim 1 wherein said Xanthomonas hydrophilic colloid is present in a concentration ranging from about 0.25 to about 1% by weight of the water in said glaze mixture.

10. A process for glazing comprising applying a coating of an aqueous glaze mixture to a substrate material, including in said glaze mixture a *Xanthomonas campestris* hydrophilic colloid in an amount from about 0.25 to about 1% by weight of the water to improve the cling of said glaze mixture while providing good spreadability, and firing said coated substrate material to provide a glazed surface thereon.

References Cited

UNITED STATES PATENTS

| | | | |
|---|---|---|---|
| 3,000,790 | 9/1961 | Jeanes et al. | 195—31 |
| 3,232,929 | 2/1966 | McNeely et al. | 106—48X |
| 3,278,332 | 10/1966 | Waxter et al. | 106—48X |

OTHER REFERENCES

A Manual of Porcelain Enameling, The Enamelist Publishing Company, 1937, p. 122.

ALFRED L. LEAVITT, Primary Examiner

W. F. CYRON, Assistant Examiner

U.S. Cl. X.R.

117—123, 124, 125, 165